Jan. 7, 1936. C. B. BEASLEY 2,026,665
REEL
Filed April 11, 1935 2 Sheets-Sheet 1

Inventor
C. B. Beasley

By Clarence A. O'Brien
Attorney

Jan. 7, 1936. C. B. BEASLEY 2,026,665
REEL
Filed April 11, 1935 2 Sheets-Sheet 2

Inventor
C. B. Beasley
By Clarence A. O'Brien
Attorney

Patented Jan. 7, 1936

2,026,665

UNITED STATES PATENT OFFICE 2,026,665

REEL

Charles Black Beasley, San Diego, Calif.

Application April 11, 1935, Serial No. 15,897

4 Claims. (Cl. 242—84.3)

REISSUED
FEB 7 1939

This invention relates to fishing reels and has as its object the provision of such a reel wherein the reel on which the line is wound is spring actuated to take up the slack therein together with brake means for arresting the rotary movement of the reel; means for releasing the reel to permit the same to run free of the spring, when desired, and manual means for rotating the reel or spool either to wind the line thereon or to pay out the line.

The invention together with its objects and advantages will be best understood from a study of the following description taken in connection with the accompanying drawings wherein:

Figure 4 is a fragmentary plan view of the control levers hereinafter more fully referred to.

Figure 1:
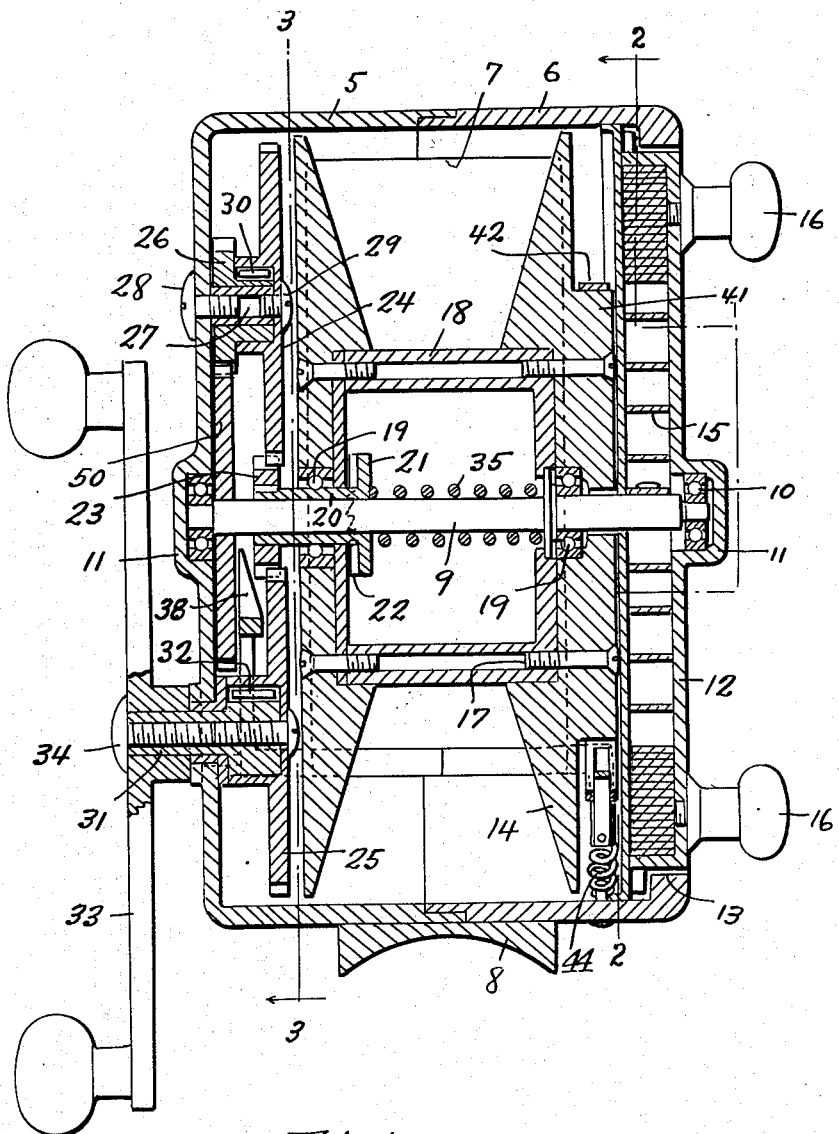
Figure 1 is an enlarged sectional view through the reel.

Referring to the drawings by reference numerals it will be seen that the reel comprises a pair of complemental casing sections 5 and 6 respectively which at their joined ends are suitably formed to provide an opening 7 through which the line operates. The casing is mounted on a suitable base 8 which may be attached to a fishing rod or other suitable support.

A reel shaft 9 has ends thereof journaled in bearings 10 provided in suitable pockets 11 formed on the casing section 5 and on a circular spring housing 12 operating within an opening 13 provided therefor in the end wall of the casing section 6.

For normally urging the shaft 9 in one direction for winding the fish line onto the reel or spool 14 there is suitably housed within the casing 12 a spring 15 secured at one end to the shaft 9 as clearly shown in Figure 1. For rotating this housing 12 there are provided suitable knobs or handles 16.

The drum or reel 14 is mounted on the shaft 9 to rotate either with the shaft or relative thereto and includes a pair of flanges secured by bolts 17 to a hub 18. Provided in the flanges are suitable bearings 19 which accommodate the shaft 9 as clearly shown in Figure 1.

Slidable on the shaft 9 is a hub 20 provided at one end with a toothed or clutch element 21 cooperating with teeth on one end of the hub 18 and as indicated generally at 22 for placing the shaft 9 in driving relation with the hub 18 of the reel.

On its other end the hub 20 is provided with a pinion 23 meshing with gears 24 and 25.

For supporting the gear 24 and a pinion gear 26 there is provided a tubular stub shaft 27 secured by a screw 28 to the end wall of the casing section 5, and the gears 24 and 26 are retained in place on the shaft 27 through the medium of a screw 29. The gears 24 and 26 as shown, have hub portions arranged in concentric relation and suitably formed to accommodate a roller clutch 30 so that upon rotation of the gear 24 in one direction said shaft through the clutch 30 will be placed in driving engagement with the pinion 26 while a reverse rotation of the gear 24 will result in an interruption of this drive connection between the gears 24 and 26 as is thought apparent.

For the gear 25 there is provided a suitable shaft 31 suitably formed in the region of the hub of the gear 25 to accommodate a similar roller clutch 32 through the medium of which the gear 25 when rotating in one direction is placed in driving engagement with the shaft 31. On the outer end of the shaft 31 there is provided a suitable handle 33, and said handle and gear 25 are properly retained on the shaft 31 through the medium of suitable bolt means 34.

The clutch member 21 is normally engaged with the teeth of the reel hub 18 as at 22 through the medium of a suitably located coil spring 35 arranged within the hub. For shifting the clutch member 21 out of engagement with the reel against the action of spring 35 there is provided a lever 36 pivoted at one end as at 37 and equipped adjacent its other end with a wedge 38 that is adapted to engage one side of the pinion 23 when the lever 36 is caused to swing in a clockwise direction and thereby force the member 21 to the right in Figure 1 to release or place the shaft 9 out of driving engagement with the hub 18. The lever 36 is normally urged to a released or normal position through the medium of a suitably anchored spring 39, and a handle for the lever 36 is provided and indicated generally by the reference numeral 40.

Figure 4:
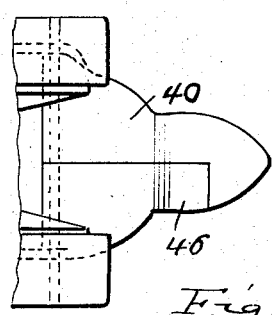

On one end thereof the reel 14 is formed to provide a brake drum 41 about which is trained a brake band 42 the ends of which are crossed as shown in Figure 1, one of said ends being bifurcated to accommodate the other end. The bifurcated end of the brake band 42 is anchored as at 43 while the other end of the band is connected with one end of a suitably anchored spring 44. This last named end of the band is also secured to one end of a brake operating lever 45 pivotally supported by the pivot 37 and equipped with a handle 46 suitably notched to accommodate the handle 40 as best shown in Figure 4.

Figure 2:
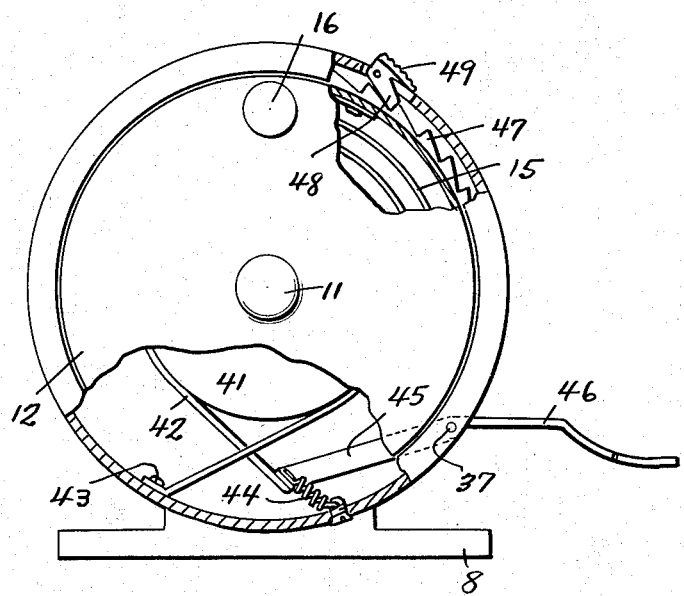
Figure 2 is a detail view taken substantially on the line 2—2 of Figure 1.
Figure 3:
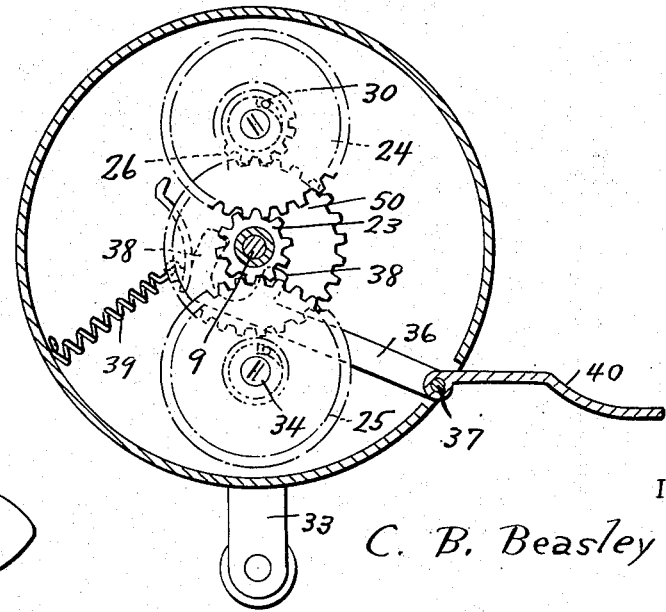
Figure 3 is an enlarged detail view taken substantially on the line 3—3 of Figure 1.

To releasably retain the spring enclosing shell or housing 12 against retrograde movement, the latter on its periphery is provided with a circular series of ratchet teeth 47 with which is engaged the dog 48 suitably mounted on the periphery of the casing section 6 and equipped with a finger piece 49 all of which is best shown in Figure 2.

The operation of the reel may be briefly described as follows: In its normal position, the clutch member 21 is engaged with the hub 18 of the reel as at 22 so that the spring 15 will control the winding of the spool and in this connection it will be apparent that to wind the spring the casing 12 is rotated in a clockwise direction, the ratchet teeth 47 and dog 48 preventing retrograde movement of the reel. With the reel thus cocked or loaded the operator by manipulating the handle 40 forces the legs 38 of the clutch fork or lever 36 upwardly into lateral engagement with the pinion 23 moving said pinion, hub 20 and clutch member 21 inwardly against the action of spring 35. With the clutch thus released it will be seen that the reel is free of driving engagement with the shaft 9 and may freely rotate about the shaft 9 as a pivot for casting purposes. Rotation of the reel 14, when casting, is controlled or retarded by the operator pressing on or releasing the lever 46 to thereby release or frictionally engage the brake band 42 with the brake drum 41; it being understood that spring 44 tends to hold the brake band 42 engaged with the drum 41 for applying a braking action to the reel, while the lever 46 is manipulated to release the drum 41 of the reel.

After the casting operation the lever 40 is released for permitting the clutch fork under action of spring 39 to return to its normal position and the clutch member 21 under action of spring 35 to engage the reel as at 22 to place the reel in driving engagement with the shaft 9. With the reel thus placed in driving engagement with the shaft 9 the spring 15 will act to yieldably urge the reel to rotate in a direction to take up any slack on the line. In this connection with the driving of the reel from the spring 15 it will be understood that the drive from the spring will be through the shaft 9 gear 50 fixed on said shaft and engaging the pinion 26 which through the medium of the clutch 30 is in driving engagement with the gear 24 that in turn is in mesh with the pinion 23, so that with the clutch 21 engaged with the hub 18 of the reel as at 22 the drive is transmitted from the shaft through the train of gearing just described and the clutch 21 to the reel.

When it is desired to manually wind the line on the spool 14, clutch 21 is engaged with the hub 18 of the spool as at 22 and the operator then turns the handle 33 which through the clutch 32 drives the gear 25 that is in mesh with the pinion 23. Obviously with clutch 21 engaged as just stated the reel 18 will then be caused to rotate about the shaft 9 as an axis for winding the line on the spool 14, and in this connection it will be noted that the gear 24 under such circumstances will run idle so that no drive will be imparted to the shaft 9 and consequently the spring 15 will not be disturbed by this manual winding of the line on the spool.

Having thus described the invention, what is claimed as new is:

1. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line.

2. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line, a hand crank, a shaft to which said hand crank is secured, a gear on the hand crankshaft in mesh with the first named pinion for transmitting drive from the hand crank to the reel for rotating the reel relative to the first named shaft.

3. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line, a hand crank, a shaft to which said hand crank is secured, a gear on the hand crankshaft in mesh with the first named pinion for transmitting drive from the hand crank to the reel for rotating the reel relative to the first named shaft, and brake means for retarding rotative movement of the reel.

4. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line, a hand crank, a shaft to which said hand crank is secured, a gear on the hand crankshaft in mesh with the first named pinion for transmitting drive from the hand crank to the reel for rotating the reel relative to the first named shaft, brake means for retarding rotative movement of the reel, and a clutch shifting fork for actuating said clutch means to place said reel out of driven engagement with the first named shaft to permit the reel to rotate free and independently of the first named shaft.

CHARLES BLACK BEASLEY.